(12) United States Patent
Stahl et al.

(10) Patent No.: US 10,981,436 B2
(45) Date of Patent: Apr. 20, 2021

(54) VENTILATION SYSTEM IN A MOBILE STRUCTURE AND METHOD FOR OPERATING A VENTILATION SYSTEM IN A MOBILE STRUCTURE

(71) Applicant: Carl Freudenberg KG, Weinheim (DE)

(72) Inventors: Ulrich Stahl, Laudenbach (DE); Volker Braeunling, Heppenheim (DE); Anette Arnold, Seeheim-Jugenheim (DE)

(73) Assignee: CARL FREUDENBERG KG, Weinheim (DE)

( * ) Notice: Subject to any disclaimer, the term of this patent is extended or adjusted under 35 U.S.C. 154(b) by 315 days.

(21) Appl. No.: 15/885,831

(22) Filed: Feb. 1, 2018

(65) Prior Publication Data
US 2018/0319256 A1 Nov. 8, 2018

(30) Foreign Application Priority Data

May 5, 2017 (EP) ..................... 17169630

(51) Int. Cl.
*B01D 53/02* (2006.01)
*B60H 3/06* (2006.01)
(Continued)

(52) U.S. Cl.
CPC ....... *B60H 3/0608* (2013.01); *B01D 46/0032* (2013.01); *B01D 46/0034* (2013.01);
(Continued)

(58) Field of Classification Search
CPC ............ B01D 2279/40; B01D 2279/50; B01D 46/0032; B01D 46/0034; B01D 46/0087;
(Continued)

(56) References Cited

U.S. PATENT DOCUMENTS 4,742,763 A * 5/1988 Holter ...................... B60H 3/06
422/83
4,930,407 A * 6/1990 Holter .................... B60H 1/008
454/75
(Continued)

FOREIGN PATENT DOCUMENTS

CN 1663666 A 9/2005
CN 202876603 U 4/2013
(Continued)

OTHER PUBLICATIONS

Translation of DE3526462 A1; Rump (Year: 1987).*

*Primary Examiner* — Christopher P Jones
(74) *Attorney, Agent, or Firm* — Leydig, Voit & Mayer, Ltd.

(57) ABSTRACT

A ventilation system for a mobile structure, in particular a motor vehicle, includes: a variably adjustable filter device including at least one controllable, variable filter characteristic with regard to a pollutant class; means for collecting information about the air quality in the surroundings of the mobile structure and in particular information about the air quality in an interior of the mobile structure; and a control unit for varying filter characteristics of the filter device in a variable, in particular continuous, manner, on the basis of the information about the air quality.

22 Claims, 2 Drawing Sheets

(51) Int. Cl.
    *B01D 46/00*     (2006.01)
    *B01D 46/44*     (2006.01)
    *B01D 46/42*     (2006.01)
    *B60H 1/00*     (2006.01)
    *B01D 46/46*     (2006.01)
    *B60H 3/00*     (2006.01)

(52) U.S. Cl.
    CPC ..... *B01D 46/0087* (2013.01); *B01D 46/4245* (2013.01); *B01D 46/442* (2013.01); *B01D 46/46* (2013.01); *B60H 1/008* (2013.01); *B60H 1/00849* (2013.01); *B60H 3/0078* (2013.01); *B60H 3/0625* (2013.01); *B01D 2279/40* (2013.01); *B01D 2279/50* (2013.01); *B60H 2003/0683* (2013.01)

(58) Field of Classification Search
    CPC .. B01D 46/4245; B01D 46/442; B01D 46/46; B60H 1/008; B60H 1/00849; B60H 2003/0683; B60H 3/0078; B60H 3/0608; B60H 3/0625
    See application file for complete search history.

(56) References Cited

U.S. PATENT DOCUMENTS

| | | | |
|---|---|---|---|
| 5,256,103 A | | 10/1993 | Abthoff et al. |
| 5,259,813 A | * | 11/1993 | Abthoff ............... B60H 3/0085 454/139 |
| 5,934,987 A | * | 8/1999 | Baruschke ......... B60H 1/00849 454/75 |
| 6,206,775 B1 | * | 3/2001 | Lemaitre ................ B60H 1/008 139/158 |
| 7,833,305 B1 | * | 11/2010 | Studer ................ B01D 46/2411 55/385.1 |
| 2005/0238549 A1 | * | 10/2005 | Hammel ................. C22B 7/006 422/168 |
| 2006/0123991 A1 | * | 6/2006 | Braeunling ........ B01D 39/2058 96/153 |
| 2006/0191412 A1 | * | 8/2006 | Sellers ............... B01D 46/0063 95/279 |
| 2008/0092742 A1 | * | 4/2008 | Marra .................... B60H 1/008 96/16 |
| 2016/0097311 A1 | | 4/2016 | Coelho Ferreira |
| 2019/0263226 A1 | * | 8/2019 | Gruenbeck .......... B60H 3/0641 |

FOREIGN PATENT DOCUMENTS

| | | | | |
|---|---|---|---|---|
| DE | 3526462 A1 | * | 1/1987 | ............ B01D 53/86 |
| DE | 102008014401 A1 | | 10/2008 | |
| DE | 102014225272 A1 | | 7/2015 | |
| DE | 102014206451 A1 | | 10/2015 | |
| EP | 3081414 A2 | | 10/2016 | |
| JP | 2841140 B2 | | 12/1998 | |
| KR | 20050005716 A | | 1/2005 | |
| KR | 20170007003 A | | 1/2017 | |
| WO | WO 2014089785 A1 | | 6/2014 | |
| WO | WO 2016094906 A1 | | 6/2016 | |
| WO | WO 2017010719 A1 | | 1/2017 | |

* cited by examiner

VENTILATION SYSTEM IN A MOBILE STRUCTURE AND METHOD FOR OPERATING A VENTILATION SYSTEM IN A MOBILE STRUCTURE

CROSS-REFERENCE TO PRIOR APPLICATION

Priority is claimed to European Patent Application No. EP 17 169 630.5, filed on May 5, 2017, the entire disclosure of which is hereby incorporated by reference herein.

FIELD

The invention relates to ventilation systems in mobile structures, in particular ventilation systems that are equipped with a filter device for filtering pollutants from the ambient air.

BACKGROUND

Ventilation systems for mobile structures are used by default in motor vehicles in order to ensure a supply of fresh air into the interior, i.e. usually the passenger compartment. These ventilation systems make it possible to control the airstream guided into the interior, in particular to control the flow speed and the heating and cooling of the air. In addition, a recirculated air fraction, which specifies a fraction of recirculated interior air, can be variably adjusted.

Ventilation systems in motor vehicles are increasingly provided with filter devices that filter the ambient air sucked in before conducting said air into the interior. In this case, the filter performance is usually determined by the airstream that is conducted through the filter device and the efficiency of the filter device. In this case, the filter device is usually passive, i.e. the efficiency of the filter device cannot be influenced, and changes merely on account of the pollutant load of said device. The absorption of pollutants from the surroundings occurs as a result of the contamination of the ambient air sucked in and of the flow speed through the filter elements of the filter device. Consistent air quality in the passenger compartment of the motor vehicle therefore usually cannot be achieved when the ventilation system is in an adjusted operating state and the air quality of the ambient air varies, and the pollution burden of the interior air in the passenger compartment can therefore be above or below a desired level.

It is also known from DE 10 2008 014 401 A1 to provide a motor vehicle comprising a device for ventilating a vehicle interior, which device activates an additional air purification process, on the basis of the air quality in the vehicle interior.

Furthermore, EP 3 081 414 A2 discloses a device for maintaining and improving the air quality in an interior, having a sensor system for detecting the air quality in the interior and in an outer space, and a filter device for purifying air. The device further comprises a control device, by means of which control signals for the filter device can be generated on the basis of signals from the sensor system. The filter device contains purification programs which are stored in advance in a control device.

DE 10 2014 206 451 A1 also discloses a method for actuating an automated air conditioning device of a motor vehicle, in which method the risk of the driver of the motor vehicle inhaling pollutants is detected and, when the risk of inhaling pollutants is detected, an operating state of a ventilation means of the air conditioning device is changed.

While too high an ambient air filtering performance leads to the filter device being rapidly clogged with particles or the filter device being rapidly loaded with gaseous, volatile pollutants (e.g. VOC: volatile organic compounds) and as a result makes it necessary to frequently replace the filter device, too small a filter effect leads to excessive pollutant nuisance for the vehicle passengers in the passenger compartment.

It is therefore desirable to provide a ventilation system which ensures that air quality in an interior is as consistently good as possible and the filter effect of the filter device is adjusted, in order to avoid replacing or purifying the filter device too frequently. Furthermore, it is intended for the operation of the ventilation fan to be maintained with as little energy consumption as possible, as low a fan speed as possible and as low a level of noise as possible.

SUMMARY

In an embodiment, the present invention provides a ventilation system for a mobile structure, in particular a motor vehicle, comprising: a variably adjustable filter device comprising at least one controllable, variable filter characteristic with regard to a pollutant class; means for collecting information about the air quality in the surroundings of the mobile structure and in particular information about the air quality in an interior of the mobile structure; and a control unit configured to vary filter characteristics of the filter device in a variable, in particular continuous, manner, on the basis of the information about the air quality.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
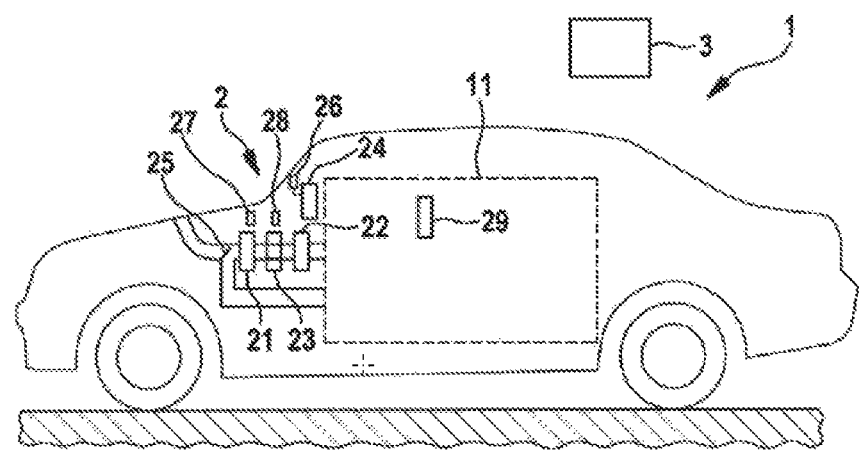
FIG. 1 is a schematic view of a ventilation system for a motor vehicle comprising a filter device.

According to a first aspect, a ventilation system for a mobile structure is provided, comprising:
- a variably adjustable filter device, the filter device comprising at least one controllable filter characteristic with regard to a pollutant class;
- a device for collecting information about the air quality in the surroundings of the mobile structure and in particular information about the air quality in an interior of the mobile structure; and
- a control unit that is designed to continuously vary the filter characteristics of the filter device, on the basis of the information about the air quality.

A concept of the above-mentioned ventilation system consists in using, on the basis of information about the air quality of the ambient air, i.e. loading of the ambient air with pollutant particles and/or gaseous, volatile pollutants (e.g. VOCs), at the current vehicle position, and correspondingly adapting a filter performance of a variably adjustable filter device, on the basis of the air quality of the ambient air. This makes it possible, for example, to set a consistent desired air quality in the interior by means of a simple control system, without having to actively intervene in the control of the ventilation system or the air conditioning unit e.g. with regard to the air temperature, the recirculated air fraction or the volumetric flow, as these parameters are usually specified by the user.

Because of the adjustable filter device, the filter device can be variable in terms of one or more of the properties of flow resistance, filter characteristics for particles, filter characteristics for gaseous, volatile pollutants (e.g. VOCs) or changing the active filter surface. As a result, the absorption of pollutant particles or gaseous, volatile pollutants from the ambient air can be adjusted.

The above-mentioned ventilation system thus makes it possible to adapt the filter effect on the basis of the currently set operating parameters of the ventilation system, such as flow rate and recirculated air fraction, and on the basis of the information about the air quality of the ambient air, such that the filter device employed is used optimally. This means that the aim is to achieve an air quality in the inside of the interior that corresponds to a desired air quality, too low a filter performance in the case of a high pollution burden in the ambient air, or too high a filter performance in the case of a low pollution burden in the ambient air being prevented by adjusting the filter characteristics. As a result, it is possible to prevent, for example, the filter device wearing too rapidly or too poor an air quality in the interior. Controlling the filter characteristics, in particular the porosity, permeability or pressure change (flow resistance), prevents too high an energy consumption or too much noise generation by the fan (blower) or by the filter device. Providing a variably adjustable filter device makes it possible to be able to thereby adjust the air quality in the interior without intervening in the control of the ventilation system.

Furthermore, operating the ventilation fan at as low an energy consumption as possible, as low fan speed as possible and as low a noise level as possible can be achieved by the above-mentioned ventilation system. In particular in the case of battery-operated vehicles (EV) having limited electrical energy available, a major focus must be placed on saving energy, and thus the adaptable filter performance and/or the air resistance of the filter makes it possible to significantly reduce the power consumption of the ventilation fan. The lower inside noise level of battery-operated vehicles is also characteristic of said vehicles, and reducing the speed of the ventilation fan lowers the noise generation correspondingly.

Furthermore, the means for collecting information about air quality in the surroundings of the motor vehicle may comprise a measuring device for measuring at least one indicator of the air quality for a pollutant class, and/or a communication device in order to receive at least one indicator of the air quality for a pollutant class from an external source.

Furthermore, an indicator of a relevant air quality for a pollutant class can be determined from the at least one indicator of the air quality for the relevant pollutant class in the surroundings and the at least one indicator of the air quality for the relevant pollutant class in the interior, on the basis of a recirculated air fraction, the control unit being designed to continuously vary the filter characteristics of the filter device, on the basis of the indicator of the relevant air quality, such that a desired air quality is achieved in the interior.

According to an embodiment, the control unit may be designed to vary the filter characteristics of the filter device with regard to the relevant pollutant class, on the basis of the information about the air quality for the pollutant class in the surroundings of the mobile structure, in such a way that, during travel, fluctuations in the air quality in an interior of the mobile structure are reduced relative to fluctuations in the air quality in the surroundings of the mobile structure.

According to an embodiment, the variably adjustable filter device may comprise one or more filter elements, the respective filter performances or filter characteristics of which can be variably adjusted mutually independently.

It can furthermore be provided for the filter performance of the relevant filter element to be adjustable using a bypass line and by a bypass valve arranged therein, in order to adjust the pressure difference across the relevant filter element. As a result, the volumetric flow can be adjusted by the relevant filter element.

Furthermore, the at least one filter element may comprise a fiber filter, the fiber filter, in particular a non-woven fabric filter, being provided with an electrically conductive substance, in particular metal fibers, e.g. silver fibers, and/or being equipped with an electrically conductive substance, in particular carbon or carbon fibers, and/or being equipped with electrically conductive metal ions, in particular with the materials Fe, Ni, Cu, Ag.

In particular, the control unit may be designed to apply a variable current to the electrically conductive fiber filter, as a controlled variable, in order to adjust a deposition rate of pollutant particles by electrostatic attraction.

Furthermore, the at least one filter element may comprise a fiber filter, the fiber filter, in particular the non-woven fabric filter, containing a proportion of shape memory metals, in particular nitinol wire, that makes it possible to change the spatial expansion of the filter element by changing the temperature. By controlling the spatial expansion of the filter element, the filter characteristics are varied in particular in a continuous or quasi-continuous manner.

Furthermore, the at least one filter element, in particular the fiber filter, may be provided with magnetic and/or chemical properties that can be used to change the spatial expansion and the change in density, surface and porosity of the filter structure.

According to a further embodiment, the at least one filter element may comprise a coated fiber filter, the fiber filter, in particular the non-woven fabric filter, being coated with $TiO_2$ particles.

In particular, the control unit may be designed to bring about the decomposition of volatile pollutants by irradiation with a controllable UV light source, the strength of the UV light radiated onto the coated fiber filter determining, as a controlled variable, the corresponding filter performance. The $TiO_2$ particle coating on the fibers of the filter material may also lead to charge separation and thus to the generation of electrostatic charges on the filter fibers, by means of irradiation with light of a defined wavelength (e.g. ultraviolet or infrared etc.) and intensity. Thus, a permanent electrostatic filter effect can be maintained and/or the electrostatic filtering performance can be regulated by metering the light intensity.

Furthermore, the filter device may comprise an ionization unit having at least one emission electrode or a capacitor field and at least one filter element, the filter element being formed as a fiber filter, in particular a non-woven fabric filter, that has a variably adjustable filter performance due to the electric field that can be variably generated by the ionization unit.

Furthermore, the filter device may comprise a plasma generation unit and at least one filter element, the filter element being formed as a fiber filter, in particular a non-woven fabric filter, that has a variably adjustable filter performance due to the ions that can be variably generated by the plasma unit.

Furthermore, the control unit may be designed to vary the filter characteristics of the filter device, on the basis of the information about the air quality in the surroundings of the motor vehicle, in such a way that, during travel, fluctuations in the air quality in an interior of the motor vehicle are reduced relative to fluctuations in the air quality in the surroundings of the motor vehicle.

Furthermore, an additional measuring means may be provided in order to detect air quality in an interior of the mobile structure, the control unit being designed to vary the filter characteristics of the filter device in recirculated air mode or mixed mode, on the basis of the information about the air quality in the interior of the mobile structure, in such a way that, during travel, fluctuations in the air quality in an interior of the mobile structure are reduced relative to fluctuations in the air quality in the mobile structure.

According to a further aspect, a method for operating the above-mentioned ventilation system for a mobile structure is provided, information about the air quality in the surroundings of the mobile structure being collected and the filter characteristics of the filter device being continuously varied, on the basis of the information about the air quality.

A motor vehicle 1 comprising a ventilation system 2 is shown schematically in FIG. 1. The ventilation system 2 comprises a fan 21 which is designed to suck in ambient air and provide said air as an airstream in an interior 11 (passenger compartment) of the motor vehicle 1.

The airstream conducted into the interior 11 can furthermore be cooled e.g. by a heat exchanger 22 of an air conditioning unit, which heat exchanger is arranged downstream of the fan 21.

Furthermore, the ambient air sucked in by the fan 21 can be guided through a filter device 23 that filters pollutants out of the ambient air.

Furthermore, a recirculated air fraction can be adjusted by a recirculated air adjuster 25 which is arranged upstream of the fan 21 and specifies a fraction of the interior air, sucked in by the fan assembly, for circulating the interior air.

The ventilation system 2 further comprises a control unit 24, by means of which operating parameters of the ventilation system 2 can be controlled. The control unit 24 can thus specify the temperature of the airstream guided into the interior 11 by adjusting the air conditioning unit, the volumetric flow of the airstream by correspondingly actuating the fan assembly 21, and the recirculated air fraction by adjusting the recirculated air adjuster 25.

Furthermore, the filter device 23 may comprise one or more adjustable filter elements 31. The filter elements 31 may each acquire different filter characteristics, for example as a result of using electrically conductive substances, photocatalytic effects, mechanical changes and/or chemical reactions. The adjustability of the filter characteristics of the filter device 23 makes it possible to specify a flow resistance of the filter device 23, a deposition rate for pollutant particles, an absorption performance for gaseous, volatile pollutants, an effective filter cross-sectional area, a degree of ionization and the like.

The control unit 24 may furthermore be connected to a measuring means 26 that measures the air quality of the ambient air, in particular the content of pollutant particles therein and the content of volatile pollutants therein. This measuring means 26 may also be directly associated with the ventilation system 2.

Alternatively or in addition to the measuring means 26, the control unit 24 may be connected to a position determining means 27 and a communication means 28 in order to receive data on the surroundings, in particular information about the air quality, from an external source, on the basis of a vehicle position. This information may comprise particle pollution for particles of different size classes, pollution by volatile pollutants, in particular for different substance groups, the air temperature, air humidity and the like. Thus, alternatively or in addition to measuring the air quality using the measuring means 26 belonging to the vehicle, in particular by transmitting the vehicle position, the corresponding information or additional information can also be received by a central unit 3 which contains indicators of or information about the local air quality at the position of the motor vehicle 1.

On the basis of the information about the air quality, the control unit 24 adjusts the ventilation system 2 correspondingly. In particular, the control unit 24 provides for the filter effect or filter characteristics of the filter device 23 to be variably (continuously) adjusted, on the basis of the air quality of the ambient air, in ambient air mode, i.e. when ambient air is conveyed into the interior 11.

Figure 2:
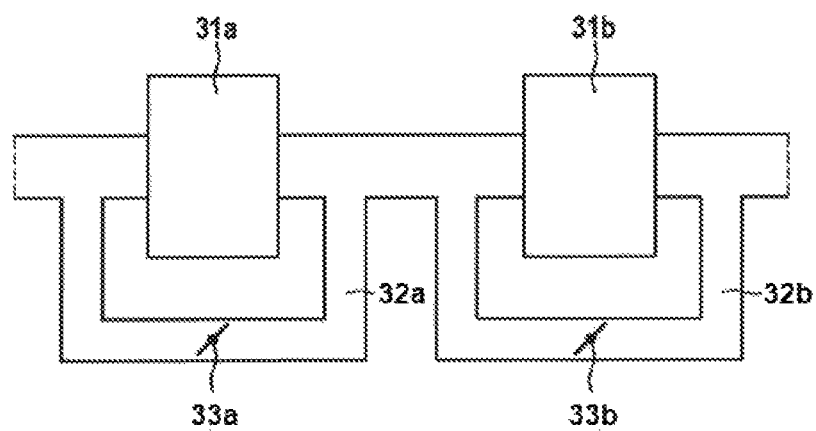
FIG. 2 is a schematic view of a filter device comprising two filter elements arranged in series.

As shown in FIG. 2, the filter device 23 may comprise a plurality of filter elements 31 for example, as is shown in more detail in FIG. 2. FIG. 2 shows two filter elements 31a, 31b that are arranged in series in the airstream. In alternative embodiments, the filter elements 31 may alternatively or additionally be arranged in the airstream of the ambient air so as to be mutually parallel, and in each case provide a specific adjustable filter effect and/or a specific filter characteristic, i.e. a filter performance that depends on the volumetric flow of the air that flowing through and the actuation in each case. The filter elements 31 may correspond in each case to one of the following filter types:

Fiber filter, in particular a non-woven fabric filter, that is provided with an electrically conductive substance, such as silver fibers, or is printed, the print substance being electrically conductive and containing e.g. carbon or carbon fibers, or is coated, the coating containing metal ions, in particular the materials Fe, Ni, Cu, Ag. By energizing the electrically conductive filter material, the filter effect for electrostatically filtering pollutant particles from the ambient air can be adjusted. In particular, adjusting a potential of the filter formed in this way can be used to adjust the deposition rate of solid matter particles by electrostatic attraction.

Fiber filter, in particular a non-woven fabric filter, that is coated with $TiO_2$ particles. These particles can bring about the decomposition of organic odorants (VOC) by means of additional irradiation with a UV light source that can be controlled by the control unit 24, and/or irradiation with light of a defined wavelength/intensity can permanently maintain the electrostatic filtering effect of the filter element or make said effect precisely adjustable. The strength of the UV light and/or light of a defined wavelength/intensity that is radiated onto the fiber filter determines the corresponding filter performance or filter characteristics.

Fiber filter that achieves an anti-allergenic effect on the fiber surface by adding an additive. An additive of this type may be citric acid for example. By controlling the amount of citric acid applied to the fiber filter, the anti-allergenic effect can be adjusted correspondingly. Additionally, a photocatalytic effect can be achieved by adding the additive and an irradiation, which effect, in addition to the anti-allergenic effect, causes decomposition of volatile pollutants (e.g. VOC).

Fiber filter, a filter characteristic being achieved by mechanical deformation. For example, the fiber filter may be provided with a shape memory metal wire, in particular nitinol wire, that makes it possible to control the spatial expansion of the filter element by changing the temperature. The shape memory metal wire changes its length by approximately 5-10% when a specifiable transition temperature is reached. By translating or arranging the shape memory metal wire correspondingly in the fiber filter that is formed as a folded filter for example, a specifiable change in length of the filter element, e.g. by pressing together or pulling apart the folds of the folded filter (in an accordion-like manner), can be provided. Actuation occurs e.g. via an electric heating element that heats the wire up to the transition temperature. Alternatively, the filter element may be formed having magnetic and/or chemical properties that can be used to change the spatial expansion or the change in density, surface and porosity of the filter structure.

Fiber filter comprising an ionization unit having at least one emission electrode or a capacitor field or a plasma generating unit, the fiber filter having a variably adjustable filter performance due to the electric field that can be variably generated by the ionization/plasma unit (ion generation). In the case of an ionization unit, an electric field is formed, by the emission electrode or the capacitor field, between the emission electrode/the capacitor (cathode) and the ventilation system metal channel wall (anode). Pollutant particles that pass through this field are electrically charged and therefore, due to increased electrostatic attraction, the deposition of said particles in the downstream fiber filter improves and thus the filter characteristics of said fiber filter improve. In the case that the filter device contains a plasma generating unit, positive and negative ions are generated from the oxygen and hydrogen molecules contained in the air, by means of the plasma generator. If these ions encounter microbes, fungi, viruses and acari in the air, said ions react chemically therewith and make them harmless. Pollutant particles that collide with these charged ions are electrically charged, and therefore the deposition of said particles in the downstream filter element, and thus the filter characteristics of said filter element, improve.

In order to adjust the volumetric flow of the air flowing through the filter elements 31a, 31b, these elements can be provided with bypass lines 32a, 32b, each of which has a bypass flap 33a, 33b arranged therein that can be controlled by the control unit 24, in order to be able to adjust a flow rate of the ambient air flowing through the relevant filter element by means of the pressure difference across the relevant filter element 31a, 31b. As a result, the filter characteristics of the filter elements 31a, 31b can alternatively or additionally be adjusted.

Additionally, the air quality in the interior can be detected and monitored using an additional measuring means 29. Alternatively or in addition to the measuring means 26, the control unit 24 may be connected to the additional measuring means 29 in order to receive information about the air quality in the interior. Therefore, alternatively or in addition to measuring the air quality via the measuring means 26, the corresponding information or additional information for the air quality in the interior can also be provided.

This information can be used, in a similar manner to ambient air mode, for controlling the filter device 23 in recirculated air mode. Because the filter device 23 is arranged in the flow path both for ambient mode and for recirculated air mode, it is irrelevant, for the control of the filter device 23, whether the information about the air quality relates to the ambient air or the interior air. Alternatively, the filter device 23 may be arranged downstream of the heat exchanger 22 when recirculated air is being filtered.

Figure 3:
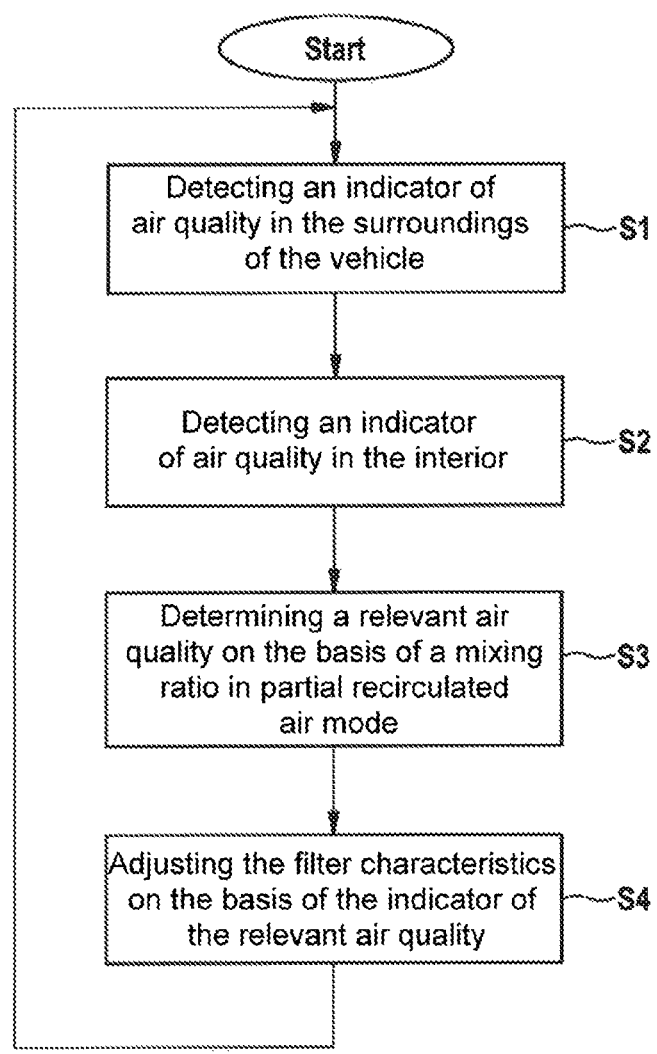
FIG. 3 is a flow diagram to illustrate a method for operating a ventilation system in a motor vehicle.

In FIG. 3, a method for operating the ventilation system 2 is explained in greater detail with reference to a flow diagram.

In step S1, information about the local air quality in the surroundings of the motor vehicle is collected. This can be carried out using the measuring means 26 and/or using a request for information about the local air quality from the external central unit 3. In particular, the request can be carried out transmitting a geographic (e.g. detected by a geolocation system, e.g. GPS) vehicle position to the external central unit and receiving the corresponding indicator, associated with the vehicle position, of the local air quality. Alternatively, information about the air quality in the entire receiving region of the central unit 3 can be transmitted, so that the information about the local air quality can be detected in the control unit 24 on the basis of the current vehicle position.

The information about the local air quality can specify an indicator of particle pollution (e.g. as an amount of particles of a specific particle size range per cubic meter of air) of the air, pollution (concentration indicator) by volatile pollutants (e.g. as an amount of a volatile substance or substance group per cubic meter of air), air humidity and the like.

The air quality in the surroundings of the vehicle can be detected by PM1, PM2.5 and PM10 measuring points in the immediate surroundings of the vehicle, and used in a suitable manner as an input value for control purposes. If this information is not available, historic data bank values for the current surroundings of the motor vehicle can be accessed, or the e.g. PM2.5 concentration actually measured by the measuring means 26, or the actually measured noxious gas concentration (e.g. VOC), is used for control purposes.

In step S2, information about air quality of the air in the interior 11 of the motor vehicle 1 is determined by the additional measuring means 29.

In step S3, air quality that is relevant for the filter device 23 is determined by the mixing ratio M, determined by the recirculated air adjuster 25, of the ambient air with the interior air in partial recirculated air mode. The mixing ratio is applied in a manner known per se to the pollutant concentrations $K_{interior}$, $K_{surroundings}$ of the different pollutant classes in the interior and in the surroundings, respectively, such as the particle size classes of pollutant particles and pollutant groups of volatile pollutants. This results in information about the air quality on the input side of the filter device 23, to which air quality the filter device 23 is to be continuously adjusted. The information about the relevant air quality contains, for example, an indicator of the air quality with regard to a pollutant or with regard to a pollutant class that can depend, for example, on the corresponding pollutant concentration $K_{interior}$, $K_{surroundings}$ in the interior and in the surroundings, respectively: $M\ K_{interior} + (1-M)\ K_{surroundings}$ In step S4, a filter characteristic is adjusted, according to the indicator of the relevant air quality (actual pollution), which data indicate e.g. particle pollution (optionally in the different particle size classes) and/or pollution of the air sucked in by the fan 21 by volatile pollutants (optionally in the different substance groups). The adjustment of the filter characteristics can be carried out for example by specifying an electric voltage for the electrostatic filter adjustment, adjusting a mechanical deformation or change in geometry (by correspondingly actuating an actuator such as the shape memory wire) or by specifying the intensity of a UV light radiation for adjusting the strength of a photocatalytic effect, or by specifying the strength of a light radiation of a defined wavelength and intensity.

In step S4, the control unit 24 adjusts or controls the filter element or the filter elements 31a, 31b of the filter device 23 in such a way that a desired applied filter characteristic is achieved. This can be carried out by specifying characteristic curves or characteristic maps or control functions that are suitable therefor. The characteristic curves or characteristic maps can take into account an indicator of the air quality of the surroundings, a controlled variable for adjusting the electrostatic, mechanical and/or photocatalytic filter effect, and a volumetric flow through the filter device 23. These adjustments can be carried out continuously without interfering in the other operating parameters of the ventilation system, such as the power consumption of the fan, the volumetric flow, the recirculated air fraction or the air temperature or the set heating or cooling performance of the heat exchanger.

Adjusting the filter device 23 has the advantage that the loading of the filter with particles and volatile pollutants is adjusted according to an applied filter characteristic, and therefore filtering the ambient air too heavily, which would cause the filter device 23 to be loaded too quickly, can be prevented. Too rapid loading of the filter device 23 leads to shorter replacement intervals or maintenance intervals and therefore to increased costs. Because the filter performance can be increased in accordance with higher pollution of the ambient air, it is possible to simultaneously prevent the filter performance being too low when the ambient air is heavily polluted. Furthermore, too high an energy consumption and too much noise generation by the fan can be reduced. In addition to the adjustments of the parameters of the filter device 23, the air moisture content can be adjusted.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A ventilation system for a mobile structure, in particular a motor vehicle, comprising:
    a variably adjustable filter device comprising at least one controllable, variable filter characteristic with regard to a pollutant class;
    means for collecting information about the air quality in the surroundings of the mobile structure and information about the air quality in an interior of the mobile structure; and
    a control unit configured to vary filter characteristics of the filter device in a variable, in particular continuous, manner, on the basis of the information about the air quality in the surroundings,
    wherein the variably adjustable filter device comprises one or more filter elements, respective filter performances of which are continuously adjustable, and
    wherein the means for collecting the information about air quality in the surroundings of the mobile structure comprise a measuring means configured to measure at least one indicator of the air quality and a communication means configured to receive at least one indicator of the air quality for a pollutant class in the surroundings of the mobile structure from an external source.

2. The ventilation system according to claim 1, wherein the means for collecting information about the air quality in the interior of the mobile structure comprise an additional measuring means configured to measure at least one indicator of the air quality for a pollutant class.

3. The ventilation system according to claim 2, wherein an indicator of an air quality for a pollutant class is determined from the at least one indicator of the air quality for the pollutant class in the surroundings and the at least one indicator of the air quality for the pollutant class in the interior, on the basis of a recirculated air fraction, and wherein the control unit is configured to continuously vary the filter characteristics of the filter device on the basis of the indicator of the air quality, such that a desired air quality is achieved in the interior.

4. The ventilation system according to claim 1, wherein the control unit is configured to vary the filter characteristics of the filter device for a pollutant class, on the basis of the information about the air quality for a pollutant class in the surroundings of the mobile structure, in such a way that, during travel, fluctuations in the air quality in an interior of the mobile structure are reduced relative to fluctuations in the air quality in the surroundings of the mobile structure.

5. The ventilation system according to claim 1, wherein the filter performance of one of the one or more filter elements is configured to be adjusted using a bypass line and by a bypass valve arranged therein, in order to adjust a pressure difference across the filter element.

6. The ventilation system according to claim 1, wherein the one or more filter elements comprise a fiber filter, wherein the fiber filter, in particular a non-woven fabric filter, is provided with an electrically conductive substance, in particular metal fibers, and/or is equipped with an electrically conductive substance, in particular carbon or carbon fibers, and/or is equipped with electrically conductive metal ions, in particular with the materials Fe, Ni, Cu, Ag.

7. The ventilation system according to claim 6, wherein the control unit is configured to apply a variable voltage to the electrically conductive fiber filter, in order to adjust a deposition rate of particles by electrostatic attraction.

8. The ventilation system according to claim 1, wherein the one or more filter elements comprise a fiber filter configured to be deformed mechanically in order to adjust a filter characteristic.

9. The ventilation system according to claim 1, wherein the one or more filter elements comprise a coated fiber filter, and
wherein the coated fiber filter comprises a non-woven fabric filter coated with $TiO_2$ particles.

10. The ventilation system according to claim 1, wherein the variably adjustable filter device is arranged in a flow path of conveyed air upstream of a fan assembly.

11. A method for operating the ventilation system according to claim 1 for the mobile structure, wherein information about the air quality for a pollutant class in the surroundings of the mobile structure is detected and wherein the filter characteristics of the filter device are varied on the basis of the information about the air quality.

12. The mobile structure, in particular a motor vehicle, comprising the ventilation system according to claim 1.

13. A ventilation system for a mobile structure, in particular a motor vehicle, comprising:
a variably adjustable filter device comprising at least one controllable, variable filter characteristic with regard to a pollutant class;
means for collecting information about the air quality in the surroundings of the mobile structure and information about the air quality in an interior of the mobile structure; and
a control unit configured to vary filter characteristics of the filter device in a variable, in particular continuous, manner, on the basis of the information about the air quality in the surroundings,
wherein the variably adjustable filter device comprises one or more filter elements, respective filter performances of which are continuously adjustable,
wherein the one or more filter elements comprise a fiber filter configured to be deformed mechanically in order to adjust a filter characteristic, and
wherein the one or more filter elements have magnetic and/or chemical properties in order to cause a change in a spatial expansion or a change in density, surface, and porosity of a filter structure of the one or more filter elements by actuating the control unit.

14. The ventilation system according to claim 13, wherein the means for collecting the information about air quality in the surroundings of the mobile structure comprise a measuring means configured to measure at least one indicator of the air quality and a communication means configured to receive at least one indicator of the air quality for a pollutant class in the surroundings of the mobile structure from an external source.

15. The ventilation system according to claim 14, wherein the means for collecting information about the air quality in the interior of the mobile structure comprise an additional measuring means configured to measure at least one indicator of the air quality for a pollutant class.

16. The ventilation system according to claim 15, wherein an indicator of an air quality for a pollutant class is determined from the at least one indicator of the air quality for the pollutant class in the surroundings and the at least one indicator of the air quality for the pollutant class in the interior, on the basis of a recirculated air fraction, and wherein the control unit is configured to continuously vary the filter characteristics of the filter device on the basis of the indicator of the air quality, such that a desired air quality is achieved in the interior.

17. The ventilation system according to claim 13, wherein the control unit is configured to vary the filter characteristics of the filter device for a pollutant class, on the basis of the information about the air quality for a pollutant class in the surroundings of the mobile structure, in such a way that, during travel, fluctuations in the air quality in an interior of the mobile structure are reduced relative to fluctuations in the air quality in the surroundings of the mobile structure.

18. The ventilation system according to claim 13, wherein the filter performance of one of the one or more filter elements is configured to be adjusted using a bypass line and by a bypass valve arranged therein, in order to adjust a pressure difference across the filter element.

19. The ventilation system according to claim 13, wherein the one or more filter elements comprise a fiber filter, wherein the fiber filter, in particular a non-woven fabric filter, is provided with an electrically conductive substance, in particular metal fibers, and/or is equipped with an electrically conductive substance, in particular carbon or carbon fibers, and/or is equipped with electrically conductive metal ions, in particular with the materials Fe, Ni, Cu, Ag.

20. The ventilation system according to claim 19, wherein the control unit is configured to apply a variable voltage to the electrically conductive fiber filter, in order to adjust a deposition rate of particles by electrostatic attraction.

21. The ventilation system according to claim 13, wherein the one or more filter elements comprise a coated fiber filter, and
wherein the coated fiber filter comprises a non-woven fabric filter coated with $TiO_2$ particles.

22. The ventilation system according to claim 13, wherein the variably adjustable filter device is arranged in a flow path of conveyed air upstream of a fan assembly.

* * * * *